(12) United States Patent
Park et al.

(10) Patent No.: US 11,095,872 B2
(45) Date of Patent: Aug. 17, 2021

(54) AUTOSTEREOSCOPIC 3-DIMENSIONAL DISPLAY

(71) Applicant: LG DISPLAY CO., LTD., Seoul (KR)

(72) Inventors: Myungsoo Park, Seoul (KR); Joonyoung Park, Paju-si (KR); Juseong Park, Goyang-si (KR); JeongKi Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 403 days.

(21) Appl. No.: 15/844,025

(22) Filed: Dec. 15, 2017

(65) Prior Publication Data

US 2018/0184075 A1   Jun. 28, 2018

(30) Foreign Application Priority Data

Dec. 26, 2016   (KR) .................... 10-2016-0179448

(51) Int. Cl.
| | |
|---|---|
| *G02B 30/00* | (2020.01) |
| *H04N 13/305* | (2018.01) |
| *H04N 13/366* | (2018.01) |
| *H04N 13/373* | (2018.01) |
| *H04N 13/351* | (2018.01) |
| *H04N 13/317* | (2018.01) |
| *G09G 3/00* | (2006.01) |
| *G09G 3/20* | (2006.01) |

(52) U.S. Cl.
CPC .......... *H04N 13/305* (2018.05); *G09G 3/003* (2013.01); *H04N 13/317* (2018.05); *H04N 13/351* (2018.05); *H04N 13/366* (2018.05); *H04N 13/373* (2018.05); *G09G 3/2096* (2013.01); *G09G 2320/0233* (2013.01); *G09G 2354/00* (2013.01)

(58) Field of Classification Search
CPC .... H04N 13/30; H04N 13/302; H04N 13/305; H04N 13/317; H04N 13/349; H04N 13/351; H04N 13/366; H04N 13/373; G09G 3/003; G09G 3/2096; G09G 2320/0233; G09G 2354/00; G09G 30/00; G09G 30/20; G09G 30/26–30
USPC ...... 359/462–464, 466; 348/42–60; 353/7–9; 349/8–9, 15
See application file for complete search history.

(56) References Cited

U.S. PATENT DOCUMENTS

| | | | | |
|---|---|---|---|---|
| 2011/0310003 | A1* | 12/2011 | de la Barre | .......... H04N 13/302 345/156 |
| 2014/0168390 | A1* | 6/2014 | Cho | ................... H04N 13/356 348/54 |
| 2015/0341623 | A1* | 11/2015 | Kim | ..................... H04N 13/351 348/59 |

FOREIGN PATENT DOCUMENTS

KR   20130128219 A  * 11/2013 ............. G02B 27/22

* cited by examiner

*Primary Examiner* — Stephone B Allen
*Assistant Examiner* — Jyotsna V Dabbi
(74) *Attorney, Agent, or Firm* — Birch, Stewart, Kolasch & Birch, LLP

(57) ABSTRACT

An autostereoscopic three-dimensional (3D) display in which the multi view structure is configured by using the lenticular lens. The autostereoscopic 3D display can include a display panel including a plurality of pixels; a plurality of lenticular lens disposed on a front surface of the display panel and having a slanted axis; a position detector measuring the distance of an observer from the display panel; and a view-map selector selecting one of view-maps in accordance with the distance of the observer from the display panel.

13 Claims, 7 Drawing Sheets

FIG. 3

| | L | C | R |
|---|---|---|---|
| P1 (OVD) | LE RE<br>2 \| 3 | LE RE<br>2 \| 3 | LE RE<br>2 \| 3 |
| P2 (NEAR) | LE RE<br>3 \| 4 | LE RE<br>2 \| 3 | LE RE<br>1 \| 2 |
| P3 (FAR) | LE RE<br>1 \| 2 | LE RE<br>2 \| 3 | LE RE<br>3 \| 4 |

FIG. 4

| | L | C | R | |
|---|---|---|---|---|
| P1 (OVD) | 1 4 3 2 \| 1 4 3 2 \| 1 4 3 2 | 1 4 3 2 \| 1 4 3 2 | 1 4 3 2 \| 1 4 3 2 | DP |
| P2 (NEAR) | 4 3 2 1 \| 4 3 2 1 \| 1 4 3 2 | 1 4 3 2 \| 2 1 4 3 | 2 1 4 3 | DP |
| P3 (FAR) | 2 1 4 3 \| 2 1 4 3 \| 1 4 3 2 | 1 4 3 2 \| 4 3 2 1 | 4 3 2 1 | DP |

AUTOSTEREOSCOPIC 3-DIMENSIONAL DISPLAY

CROSS-REFERENCE TO RELATED APPLICATIONS

This application claims the priority benefit of Korea Patent Application No. 10-2016-0179448 filed on Dec. 26, 2016 in the Republic of Korea, which is incorporated herein by reference for all purposes as if fully set forth herein.

BACKGROUND

Technical Field

The present disclosure relates to an autostereoscopic three-dimensional (3D) display in which the multi view structure is configured by using a lenticular lens (hereinafter also referred to as a 'lenticular lens type'). In particular, the present disclosure relates to a lenticular lens type autostereoscopic 3D display representing high quality 3D images in which the brightness differences between the view areas are uniformed regardless of the tolerances of the manufacturing process.

Description of the Related Art

Due to the development of the stereoscopic image display technologies, a stereoscopic image reproducing technique is applied to a display device such as a television or monitor, so that anyone can appreciate a stereoscopic image anywhere. A stereoscopic image display may be defined as a system for artificially reproducing a 3D image.

One reason why a person feels visually stereoscopic is because of binocular disparity, which is caused by the fact that the eyes are separated apart 65 mm in the horizontal direction. When a person's eyes observe a thing, due to binocular parallax, each of the two eyes sees different images, respectively, viewed from a slightly different angle. As these two images are sent to the brain through the retina, the brain can recognize the stereoscopic image by precisely combining these two images.

Generally the autostereoscopic 3D display generates a virtual stereoscopic effect through a design that displays both the left eye image and the right eye image in the two-dimensional display according to the mechanism of the binocular disparity, and sends them to the left eye and the right eye, respectively. As the methods for realizing binocular parallax, a spectacle type (or glasses type) display and a non-spectacle type (or non-glasses type) display have been developed.

In the non-spectacle type display (or 'autostereoscopic 3D display'), the left eye image and the right eye image are displayed at the same time, and the optical axes of these two images are separated from each other. These images are provided to the left eye and the right eye, respectively. The non-spectacle type display may be divided into the parallax barrier system, the lenticular lens system and the integral photography system. In the parallax barrier system, a vertical grid-like aperture is disposed on the front of the display to separate the left eye image and the right eye image. In the lenticular lens system, a lens film in which a plurality of semi-cylindrical lenses is continuously arrayed is attached to a front surface of the display to provide the left eye image and the right eye image. The integral photography system uses a dragonfly-eye-shaped lens plate to separate the left eye image and the right eye image.

Using the lenticular lens type autostereoscopic 3D display, it is preferable that the user is located at the optimum viewing position or at the optimum viewing distance for enjoying the correct 3D video images. For example, to enjoy the 3D video images using the large sized TV monitors being the lenticular lens type autostereoscopic 3D display and having the 40 inch or more diagonal length, the observer should always sit at the same optimum viewing position.

There is a demand for a lenticular lens type autostereoscopic 3D display having a wide range of the optimum viewing position for convenience of the observer. Further, a lenticular lens type autostereoscopic 3D display in which the optimum viewing position is automatically changed in accordance with the location of the observer is needed.

SUMMARY

In order to overcome or address the above mentioned drawbacks, one purpose of the present disclosure is to provide a lenticular lens type autostereoscopic 3D display having an unfixed optimum viewing angle. Another purpose of the present disclosure is to provide a lenticular lens type autostereoscopic 3D display automatically controlling the optimum viewing angle as the observer's location is changed. Still another purpose of the present disclosure is to provide a lenticular lens type autostereoscopic 3D display representing the correct 3D video images in active according to the location of the observer.

In order to accomplish the above purpose, the present disclosure provides an autostereoscopic 3D display comprising a display panel including a plurality of pixels, and an aperture area disposed at each pixel; a lens film disposed on a front surface of the display panel and including a plurality of lenticular lens, the lenticular lenses having a slanted axis and continuously arrayed along a lateral direction; a position detector measuring a distance of an observer from the display panel; a memory storing a plurality of view-maps; and a view-map selector selecting one of the view-maps stored in the memory in accordance with the distance of the observer from the display panel measured by the position detector.

In one embodiment, any one lenticular lens includes n view areas where n is natural number, each of the view areas having a strip shape parallel with the slanted axis and having a view width, and the view widths of the view areas having a same value; and any one aperture area disposed as corresponding to any one of the view areas.

In one embodiment, the aperture areas disposed at a $k^{th}$ view area are disposed at the pixel areas representing a $k^{th}$ video image, where k is one of 1 to n.

In one embodiment, a width of the aperture area corresponds to the view width.

In one embodiment, the view-maps includes a standard view-map corresponding to an optimum viewing distance defined by a focal length of the lenticular lens; a first view-map corresponding to a first viewing point closer to the display panel than the optimum viewing distance; and a second view-map corresponding to a second view point far away from the display panel than the optimum viewing distance.

In one embodiment, the view-map selector selects the standard view-map when the position of the observer measured by the position detector is corresponding to the optimum viewing distance; the view-map selector selects the first view-map when the position of the observer is corresponding to the first viewing point; and the view-map selector selects the second view-map when the position of the observer is corresponding to the second viewing point.

In one embodiment, the first viewing position includes a plurality of near viewing positions set at every unit distance from the optimum view distance as going closer; the first view-map includes a plurality of near view-maps corresponding to the plurality of the near viewing positions, respectively; the second position includes a plurality of far viewing positions set at every unit distance from the optimum vide distance as going away; and the second view-map includes a plurality of far view-maps corresponding to the plurality of the far viewing positions, respectively.

In one embodiment, the standard view-map has a standard view-map pattern by which all pixel areas of the display panel provide a same image to the observer located at the optimum viewing distance.

In one embodiment, the first view-map includes the standard view-map pattern allocated at a first area of the display panel, the first area providing a same image as the image of the optimum viewing distance to the observer located at the first viewing point; and a compensated view-map pattern allocated at a second area of the display panel, the second area providing different image from the image of the optimum viewing distance to the observer located at the first viewing point.

In one embodiment, the second view-map includes the standard view-map pattern allocated at a first area of the display panel, the first area providing a same image as the image of the optimum viewing distance to the observer located at the second viewing point; and a compensated view-map pattern allocated at a second area of the display panel, the second area providing different image from the image of the optimum viewing distance to the observer located at the second viewing point.

The present disclosure provides a lenticular lens type autostereoscopic 3D display in which images represented on the pixels of display are divided and separately provided to the observer's eyes using a lens film attached on the surface of the display. The lens film includes a plurality of lenticular lens of which viewing angle is defined. Preferably the lenticular lens type autostereoscopic 3D display according to the present disclosure always provides correct 3D video images to the observer even though the observer changes his/her location. The lenticular lens type autostereoscopic 3D display according to the present disclosure provides the correct 3D video images to the observer in accordance with the location of the observer, regardless of the focus (or focusing length) of the lenticular lens. Therefore, the observer can enjoy the stereoscopic images without being restricted by the optimum viewing distance or the optimum viewing position.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

In the drawings:

FIG. 3 is a table summarizing the images separated by the lenticular lens provided to the left eye and the right eye in accordance with the viewing distances of the observer shown in FIG. 2.

FIG. 4 is a schematic diagram illustrating a view map of a lenticular lens type autostereoscopic 3D display according to an embodiment of the present disclosure.

DETAILED DESCRIPTION OF THE EMBODIMENTS

Figure 1:
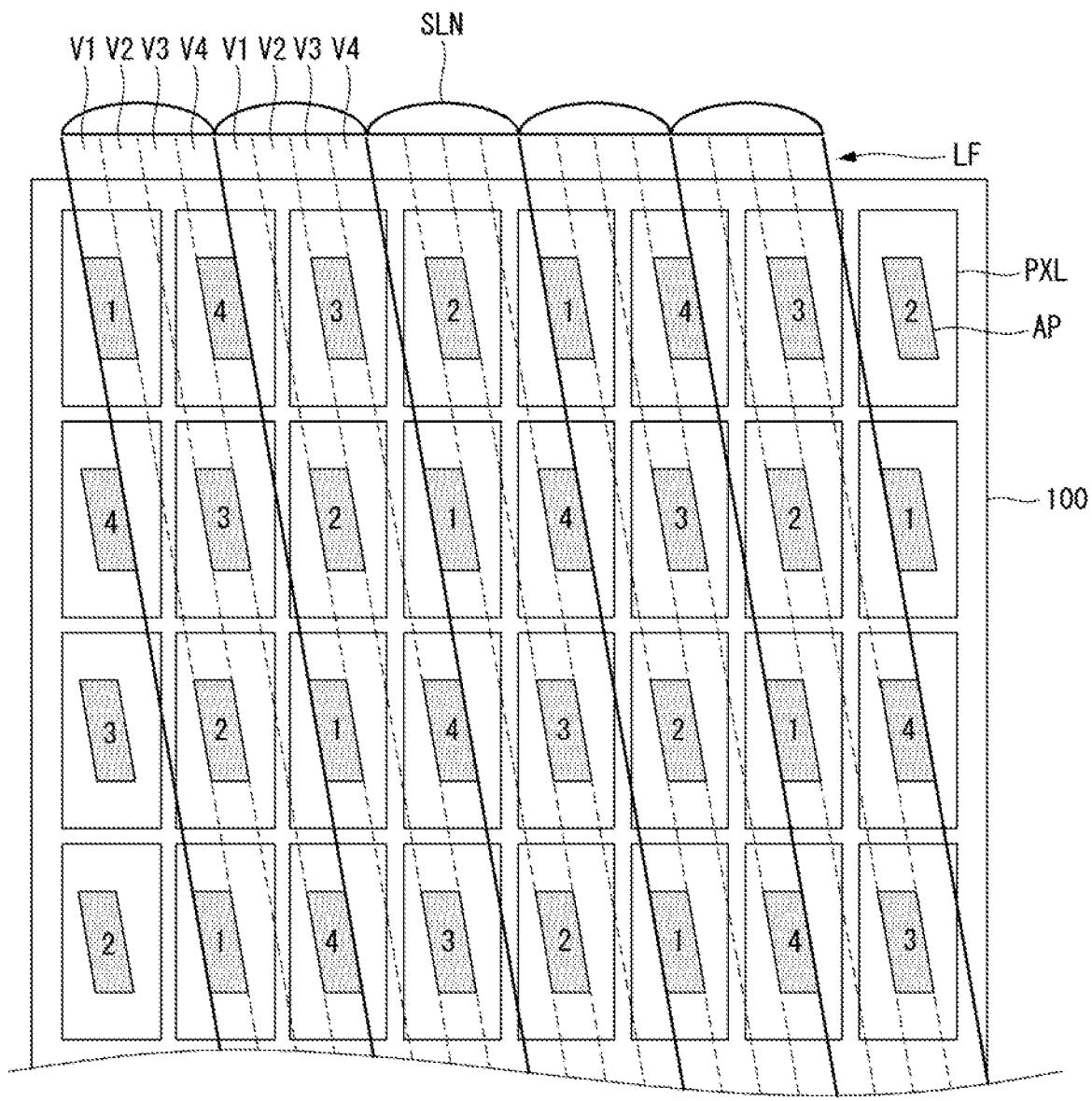
FIG. 1 is a plane view illustrating the structure of a lenticular lens type autostereoscopic 3D display according to an embodiment of the present disclosure.

Referring to attached figures, preferred embodiments of the present disclosure will be explained. Like reference numerals designate like elements throughout the detailed description. However, the present disclosure is not restricted by these embodiments but can be applied to various changes or modifications without changing the technical spirit. In the following embodiments, the names of the elements are selected by considering the easiness for explanation so that they may be different from actual names.

Hereinafter, referring to FIG. 1, an embodiment of the present disclosure will be explained. FIG. 1 is a plane view illustrating the structure of a lenticular lens type autostereoscopic 3D display according to the embodiment of the present disclosure. All components of the lenticular lens type autostereoscopic 3D display according to all embodiments of the present disclosure are operatively coupled and configured.

Referring to FIG. 3, the lenticular lens type autostereoscopic 3D display according to the embodiment of the present disclosure comprises a display panel DP and a lens film LF disposed on the upper surface of the display panel DP. The display panel DP includes a plurality of the pixels P×L arrayed in a matrix manner. At each pixel PXL, an aperture area AP is defined. The aperture area AP is the area for representing the color and brightness allocated at the pixel PXL. For example, the aperture area AP may be defined as the area representing any one color of the red color R, the green color G and the blue color B. Other areas of the display panel DP excepting the aperture area AP are covered by the black matrix.

The display panel DP may be a flat display panel such as the liquid crystal display panel or the organic light emitting diode display panel. The display panel DP may further include various elements such as a gate line, a data line, a thin film transistor and so on, as well as the pixel PXL. Here, for convenience, these elements of the display panel DP would not be explained.

The lens film LF includes a plurality of lenticular lenses SLN having a semi-cylindrical shape and disposed continuously in lateral direction. The lenticular lenses SLN may be disposed on the upper surface of the display panel DP as aligned as having a predetermined slanted or tilted angle. Here, the inclination (or the slanted angle) may be represented by the unit of pixel PXL. For example, in the ⅓ delta structure, the inclination of the lenticular lens SLN may be same with the value, (width of the pixel)/(3×length of the pixel). That is, the delta value may be represented as 'n/m' (n is a natural number, and m is a natural number larger than n).

The lenticular lens includes k view areas separated from each other. The view-areas are defined as a plurality of segments having the same view width is arrayed in serial. At each view area has a plurality of the aperture areas AP. The pixel areas PXL allocated at the same view area represent the same video image. The view area division may be decided by the design method. Here, various methods for dividing (or separating) the view areas will not be mentioned.

Here, the view width defined at the lenticular lens means the distance between the left slanted lines and the right slanted line of one view area. Generally, the distance between two slanted lines are defined by the length of the line perpendicular to these slanted lines. However, the view width is defined as the lateral (or horizontal) length (length of the line parallel to the X-axis) between two slanted lines defining one view area. Further, two lines defining one view area are parallel with the slanted axis LAX of the lenticular lens SLN.

FIG. 1 shows the case that the lenticular lens divides 4 view areas for convenience of description. The pixels allocated to each view area V1 to V4 display unique images different from each other. That is, the display shown in FIG. 1 represents 4 images observing at 4 directions, at the same time. These 4 images are separated by the lenticular lens and then provided to the 4 view areas, respectively. According to the view-map design, the number of the view areas may be changed. The number of the view areas may be larger than 4 or less than 4.

The number written on each aperture area AP in FIG. 1 preferably means the number of image. For example, the aperture area AP having number '1' represents the first image i.e., S1 of FIG. 1. The aperture area AP providing the first image S1 is allocated at the first view area V1. The aperture area AP having number '2' represents the second image S2. The aperture area AP providing the second image S1 is allocated at the second view area V2. Like this manner, the aperture areas AP providing any one image among the first image to the fourth image are allocated at any one of the seven view areas V1 to V4.

Referring to FIG. 1, each of the pixel areas PXL of the display panel DP represents any one kind image among the four images. For example, the four images are represented in a manner of the view-map such as 1-4-3-2 order in the horizontal direction. Further, this view-map has the 1-4-3-2 order of the four images in the vertical direction. This view-map is the standard view map defined as providing the correct 3D video images for an observer who locates at the optimum viewing distance. The optimum viewing distance is set by the manufacturer of the display panel, considering the specifications of the display panel such as the diagonal length of the display panel at which the observer can enjoy the video image with the best quality. For the autostereoscopic 3D display, the optimum viewing distance means that the left eye image and the right eye image are correctly provided to the left eye and the right eye of the observer, at the optimum viewing distance.

At the optimum viewing distance, among the 4 images representing images observing at 4 directions respectively, the first image is provided to the left eye of the observer and the second image is provided to the right eye of the observer. Therefore, the observer can recognize the stereoscopic images as looking the object at one direction. In addition, as the obverse moves lateral side, the left eye and the right eye are provided two images, respectively as looking the object at another direction. Like this, the observer can enjoy the stereoscopic images correctly. However, when the observer may moves closer to or away from the optimum viewing distance, the observer cannot enjoy the correct stereoscopic images. The optimum viewing distance may be set by controlling the optical factors such as the focal length (or focus) of the lenticular lens SLN and/or the gap between the display panel DP and the lens film LF. Therefore, the range of the optimum viewing distance should have very short distance range.

Figure 2:
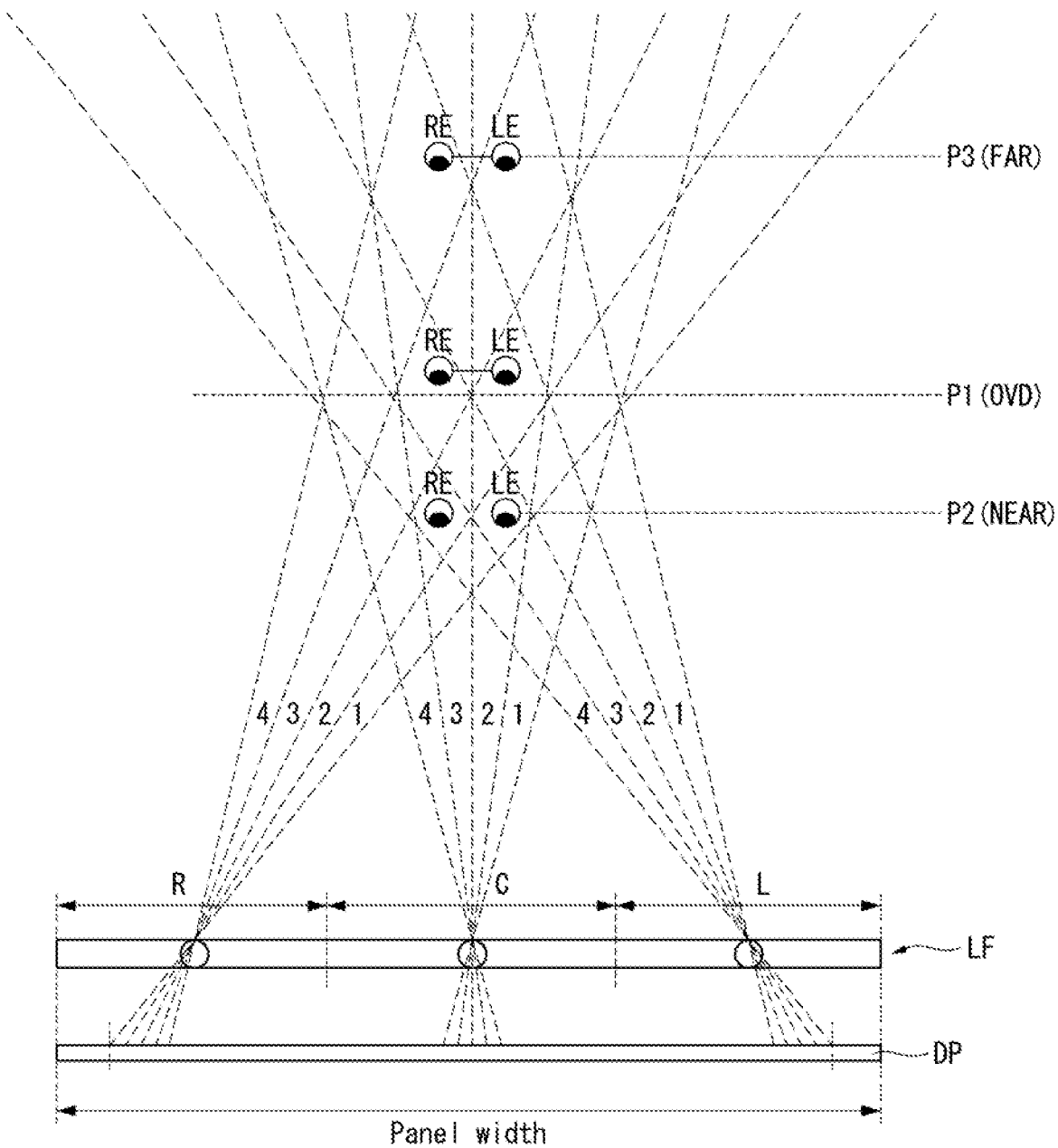
FIG. 2 is a schematic diagram illustrating a mechanism for providing the stereoscopic images to an observer varying his/her distance in the lenticular lens type autostereoscopic 3D display.

Hereinafter, referring to FIGS. 2 and 3, the optimum viewing distance of the lenticular lens type autostereoscopic 3D display will be explained. Further, a reason why the observer cannot enjoy the correct stereoscopic image when the observer moves out of the optimum viewing distance will be explained. FIG. 2 is a schematic diagram illustrating a mechanism for providing the stereoscopic images to an observer varying his/her distance in the lenticular lens type autostereoscopic 3D display. FIG. 3 is a table summarizing the images separated by the lenticular lens provided to the left eye and the right eye in accordance with the viewing distances of the observer shown in FIG. 2.

FIG. 2 illustrates that any one pixel row of the display panel DP shown in FIG. 1, provides the stereoscopic images. For example, as shown in FIG. 1, in the first row of the display panel DP, the first pixel is allocated for the first image, the second pixel is allocated for the fourth image, the third pixel is allocated for the third image and the fourth pixel is allocated for the second image. Representing the stereoscopic image with the view-map as shown in FIG. 1, at the optimum viewing distance, the four images (looking the object at 4 different directions serially disposed in lateral direction) of the stereoscopic image are provided as dividing in the order of "first image—second image—third image—fourth image" with a predetermined distance, as shown in FIG. 2. Here, the predetermined distance corresponds to the binocular distance between the left eye and the right eye. For example, the binocular distance may be 65 mm.

The images recognized by the observer, when the observer is located at the first viewing point P1 corresponding to the optimum viewing distance OVD, will be explained. Among the 4 images provided from the central area C of the display panel DP, the second image is provided to the left eye LE of the observer and the third image is provided to the right eye RE of the observer. Among the 4 images provided from the left side area L of the display panel DP, the second image is provided to the left eye LE of the observer and the third image is provided to the right eye RE of the observer. In addition, among the 4 images provided from the right side area R of the display panel DP, the second image is provided to the left eye LE of the observer and the third image is provided to the right eye RE of the observer. That is, at the first point corresponding to the optimum viewing distance OVD, among the four images represented onto the display panel DP, the left eye LE of the observer sees only the second image and the right eye RE of the observer sees only the third image. Therefore, the observer can enjoy the correct stereoscopic image.

Next, the images recognized by the observer, when the observer is located at the second view point P2 corresponding to a near viewing distance NEAR than the optimum viewing distance OVD, will be explained. As shown in FIGS. 2 and 3, among the 4 images provided from the central area C of the display panel DP, the second image is provided to the left eye LE of the observer and the third image is provided to the right eye RE of the observer. Among the 4 images provided from the left side area L of the display panel DP, the third image is provided to the left eye LE of the observer and the fourth image is provided to the right eye RE of the observer. In addition, among the 4 images provided from the right side area R of the display panel DP, the first image is provided to the left eye LE of the observer and the second image is provided to the right eye RE of the observer.

That is, at the second viewing point P2 corresponding to a near viewing distance NEAR, among four images provided from the display panel DP, the third, the second and the first images are provided to the left eye LE of the observer at the same time. Further, the fourth, the third and the second images are provided to the right eye RE of the observer at the same time. Therefore, the observer may not enjoy the correct stereoscopic image.

Finally, the images recognized by the observer, when the observer is located at the third view point P3 corresponding to a far viewing distance FAR than the optimum viewing distance OVD, will be explained. As shown in FIGS. 2 and 3, among the 4 images provided from the central area C of the display panel DP, the second image is provided to the left eye LE of the observer and the third image is provided to the right eye RE of the observer. Among the 4 images provided from the left side area L of the display panel DP, the first image is provided to the left eye LE of the observer and the second image is provided to the right eye RE of the observer. In addition, among the 4 images provided from the right side area R of the display panel DP, the third image is provided to the left eye LE of the observer and the fourth image is provided to the right eye RE of the observer.

That is, at the third viewing point P3 corresponding to a far viewing distance FAR, among four images provided from the display panel DP, the first, the second and the third images are provided to the left eye LE of the observer at the same time. Further, the second, the third and the fourth images are provided to the right eye RE of the observer at the same time. Therefore, the observer may not enjoy the correct stereoscopic image.

Considering the above conditions, the present disclosure provides a method and/or structure of the autostereoscopic 3D display by which the observer can enjoy the correct stereoscopic images at any viewing point. Referring to FIG. 4, a view-map of images for allocating to the pixel areas PXL of the display panel applied to the lenticular lens type autostereoscopic 3D display according to the present disclosure will be explained. FIG. 4 is a schematic diagram illustrating a view map of a lenticular lens type autostereoscopic 3D display according to the present disclosure.

Referring to FIG. 4, the lenticular lens type autostereoscopic 3D display according to the present disclosure includes a view-map being varied in accordance with the distance of the observer for providing the correct stereoscopic images to the observer, and a detector for detecting the location of the observer. For example, when the observer is located at the first viewing point P1 corresponding to the optimum viewing distance OVD, the display panel represents the four images to the pixel area PXL according to the standard view-map. Here, the standard view-map is the view-map for providing the 4 images in an order of "first image—fourth image—third image—second image" to the "first pixel—second pixel third pixel—fourth pixel" of the first row of the display panel DP. Specifically, the standard view-map is applied to all pixel areas PXL of the whole display panel DP. That is, four images are allocated at all pixel areas PXL disposed at the central area C, at the left side area L and at the right side area R, in accordance with the standard view-map.

In the interim, when the observer is located at the second view point P2 corresponding to a near view distance NEAR closer to the display panel DP than the optimum viewing distance OVD, the standard view-map is applied to the pixel areas PXL disposed at the central area C. However, the compensated view-maps are applied to the pixel areas PXL disposed at the left side area L and the right side area S. For example, the pixel areas PXL of the left side area L are applied with a first compensated view-map in which the second image is allocated to the pixel area for the third image by the standard view-map, and the third image is allocated to the pixel area for the fourth image by the standard view-map. Further, the pixel areas PXL of the right side area L are applied with a second compensated view-map in which the second image is allocated to the pixel area for the first image by the standard view-map, and the third image is allocated to the pixel area for the second image by the standard view-map.

In addition, when the observer is located at the third view point P3 corresponding to a far view distance FAR further away from the display panel DP than the optimum viewing distance OVD, the standard view-map is applied to the pixel areas PXL disposed at the central area C. However, the compensated view-maps are applied to the pixel areas PXL disposed at the left side area L and the right side area S. For example, the pixel areas PXL of the left side area L are applied with a third compensated view-map in which the second image is allocated to the pixel area for the first image by the standard view-map, and the third image is allocated to the pixel area for the second image by the standard view-map. Further, the pixel areas PXL of the right side area L are applied with a fourth compensated view-map in which the second image is allocated to the pixel area for the third image by the standard view-map, and the third image is allocated to the pixel area for the fourth image by the standard view-map.

In detail, as shown in FIG. 4, when the observer is located at the first view point P1, the display panel DP represents the four images in accordance with a standard view-map in which the pixel areas PXL are allocated for four images in the '1-4-3-2' order. When the observer is located at the second view point P2, the display panel DP represents the four images in accordance with a near view-map in which the pixel areas PXL at the left side area L are applied with the '4-3-2-1' order, the pixel areas PXL at the central area C are applied with the '1-4-3-2' order, and the pixel areas PXL at the right side area R are applied with the '2-1-4-3' order. Further, when the observer is located at the third view point P3, the display panel DP represents the four images in accordance with a far view-map in which the pixel areas PXL at the left side area L are applied with the '2-1-4-3' order, the pixel areas PXL at the central area C are applied with the '1-4-3-2' order, and the pixel areas PXL at the right side area R are applied with the '4-3-2-1' order.

Figure 5:
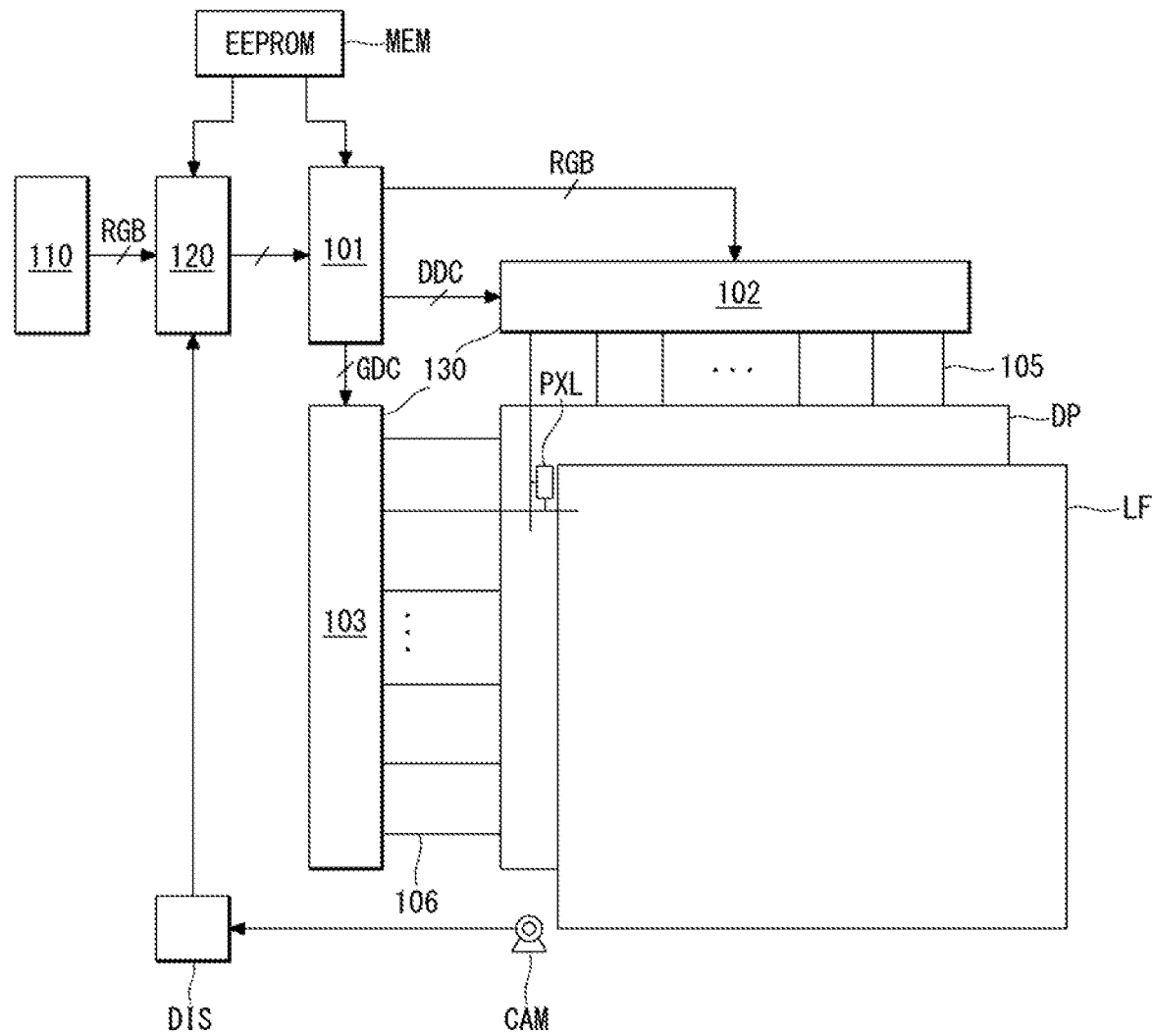
FIG. 5 is a system diagram illustrating a structure of a lenticular lens type autostereoscopic 3D display according to an embodiment of the present disclosure.

Hereinafter, one preferred embodiment for a lenticular lens type autostereoscopic 3D display according to the present disclosure having the features described above will be explained. FIG. 5 is a system diagram illustrating a structure of a lenticular lens type autostereoscopic 3D display according to the present disclosure.

Referring to FIG. 5, the autostereoscopic 3D display according to the present disclosure comprises a display panel DP, a position detector DIS, a display panel driver 130, a lenticular lens LF, a host system (e.g., computer) 110, a view-map selector 120, a memory MEM and a timing controller 101.

The display panel DP may be any one of the flat display panel including a liquid crystal display (LCD) panel, a field emission display (FED) panel, a plasma display panel (PDP), and an organic light emitting diode display (OLED) panel. The display panel DP includes a plurality of data lines 105 and a plurality of gate lines (or scan lines) 106 crossing each other. A plurality of pixel areas PXL is disposed at each of the area divided by the crossing structure in a matrix manner. Each pixel area PXL may include a plurality of sub pixels representing different colors. The display panel DP represents the 2D images at the 2D mode and the 3D images at the 3D mode according to the view-map.

The display panel driver 130 may include a data driving circuit 102 and a gate driving circuit 103. The data driving circuit 102 supplies the data voltages corresponding to the 2D or 3D images to the data lines 105. The gate driving circuit 103 supplies the gate pulse (or scan pulse) to the gate lines 106 sequentially. The display panel driver 130 may supply the video data for the stereoscopic images to the pixel areas PXL of the display panel DP in a spatial division method at the 3D mode.

The data driving circuit 102 converts the digital video data received from the timing controller 101 into the analog gamma voltages, and sends them to the data lines 105 as the data voltages. The gate driving circuit 103 supplies the gate pulse to the gate lines 106 as being synchronized with the data voltages, by the timing controller 101. The gate pulses are sequentially supplied to the gate lines 106.

The timing controller 101 supplies the digital video data RGB of the 2D/3D images received from the host system 110 to the data driving circuit 102. With the digital video data RGB of the 2D/3D images, the timing controller 101 receives the timing signals including the vertical synchronizing signal, the horizontal synchronizing signal, the data enable signal and the main clock signal from the host system 110. Using the timing signals received from the host system 110, the timing controller 101 controls the operating timing of the display panel driver 130 and generates the timing control signals DDC and GDC for synchronizing the operation timing of the drivers.

The host system 110 may be any one of a television set, a set-top box, a navigation system, a DVD system, a blue-ray player, a personal player, a home theater system and/or a smart phone. Using a scaler, the host system 110 may converts the digital video data of the 2D/3D images into another video data satisfying the resolution format of the display panel DP, and then send the changed data and the timing signals to the timing controller 101.

Between the host system 110 and the timing controller 101, the view-map selector 120 is placed. The view-map selector 120 may select a view-map corresponding to the flag received from the position detector DIS from the memory MEM, and may send the view-map to the timing controller 101.

The position detector DIS is disposed at the front surface of the display panel DP for detecting the distance between the display panel DP and the observer. The position detector DIS may include a means for measuring the position of the observer. For the case of using an image processor for the measuring the distance, the position detector DIS may further include a camera CAM. For example, measuring the distance between the observer and the display panel DP, the position detector DIS may decide that the observer is located at any one view position among the optimum viewing distance, the near viewing distance and the far viewing distance. The position detector DIS may send the flag selected in accordance with the distance of the observer to the view-map selector 120 or the host system 110. Here, the case that the position detector DIS sends the flag to the view-map selector 120 will be explained.

The memory MEM includes various information required for driving the display panel DP. For example, the memory MEM may include the information about a rising timing and a duration period required for generating the signals in the timing controller 101. Further, the memory MEM includes the view-maps required for representing the features of the present disclosure. Therefore, it is preferable that the memory MEM is connected to the timing controller 101 and the view-map selector 120. The view-map selector 120 selects one view-map in accordance with the flag received from the position detector 120 decided by the observer's location, and sends the view-map to the timing controller 101.

Figure 6:
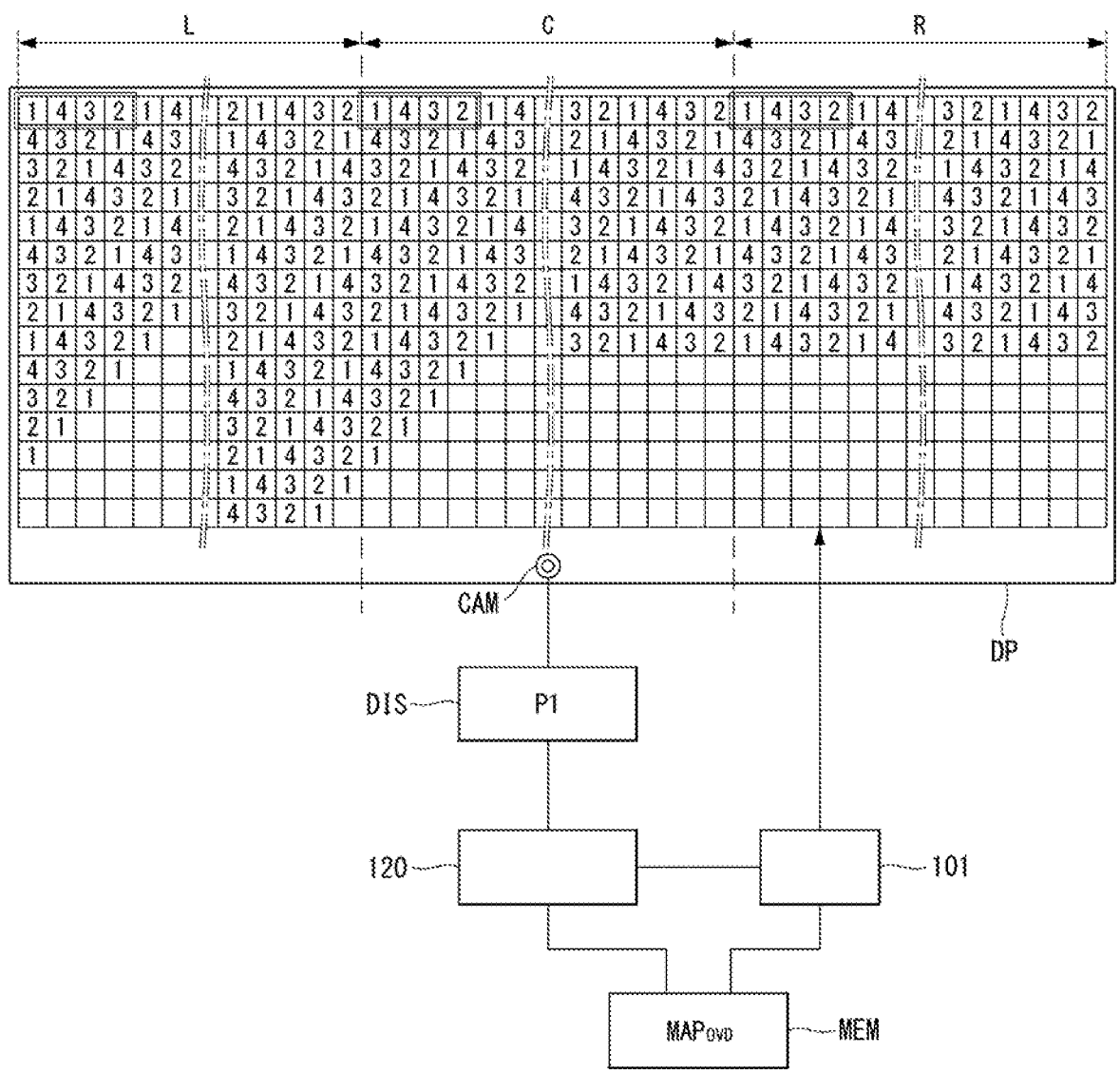
FIG. 6 is a schematic diagram illustrating a view map of the lenticular lens type autostereoscopic 3D display when the observer is located at the optimum viewing distance according to an embodiment of the present disclosure.
Figure 7:
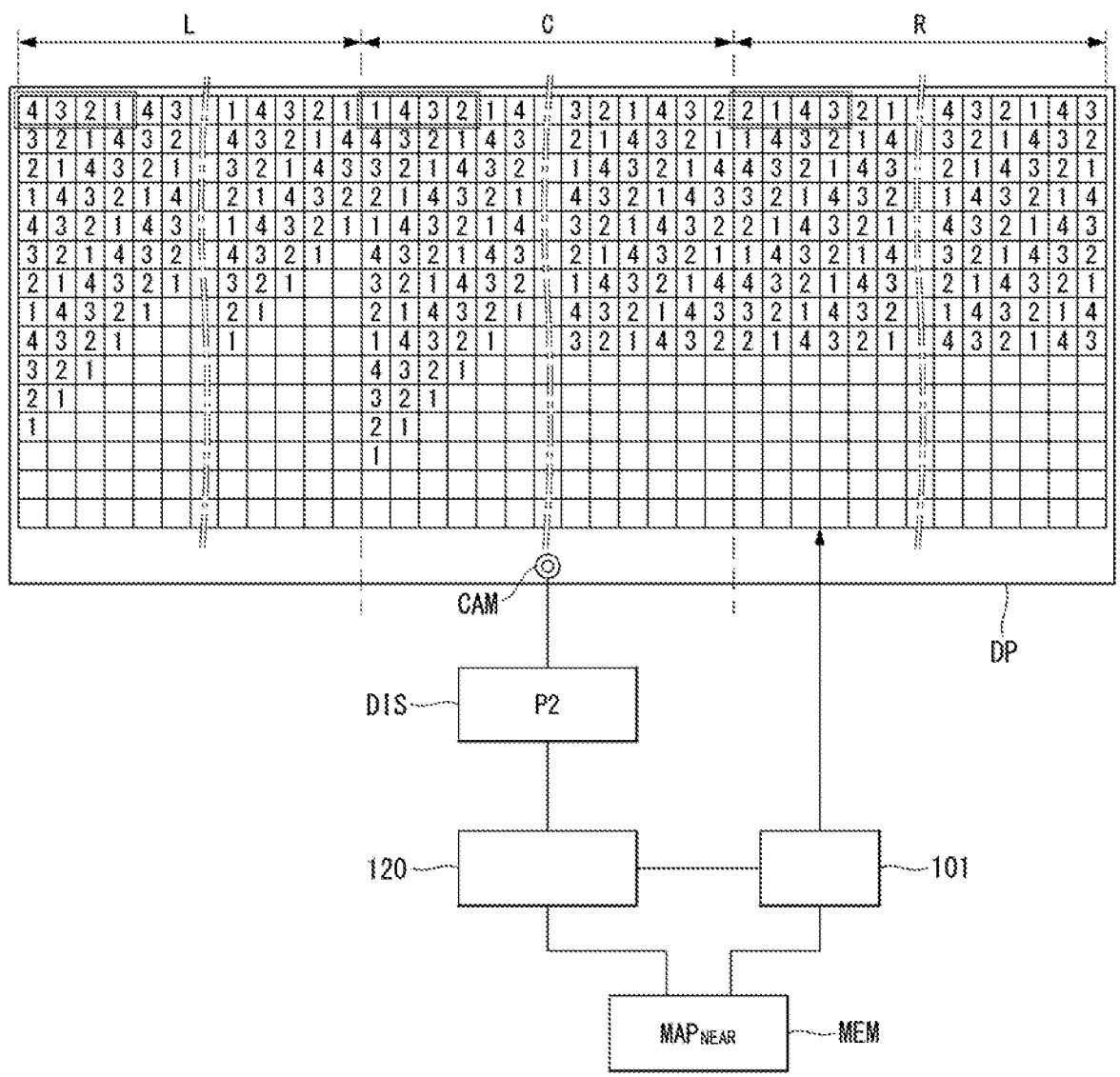
FIG. 7 is a schematic diagram illustrating a view map of the lenticular lens type autostereoscopic 3D display when the observer is located at a near distance from the display panel according to an embodiment of the present disclosure.
Figure 8:
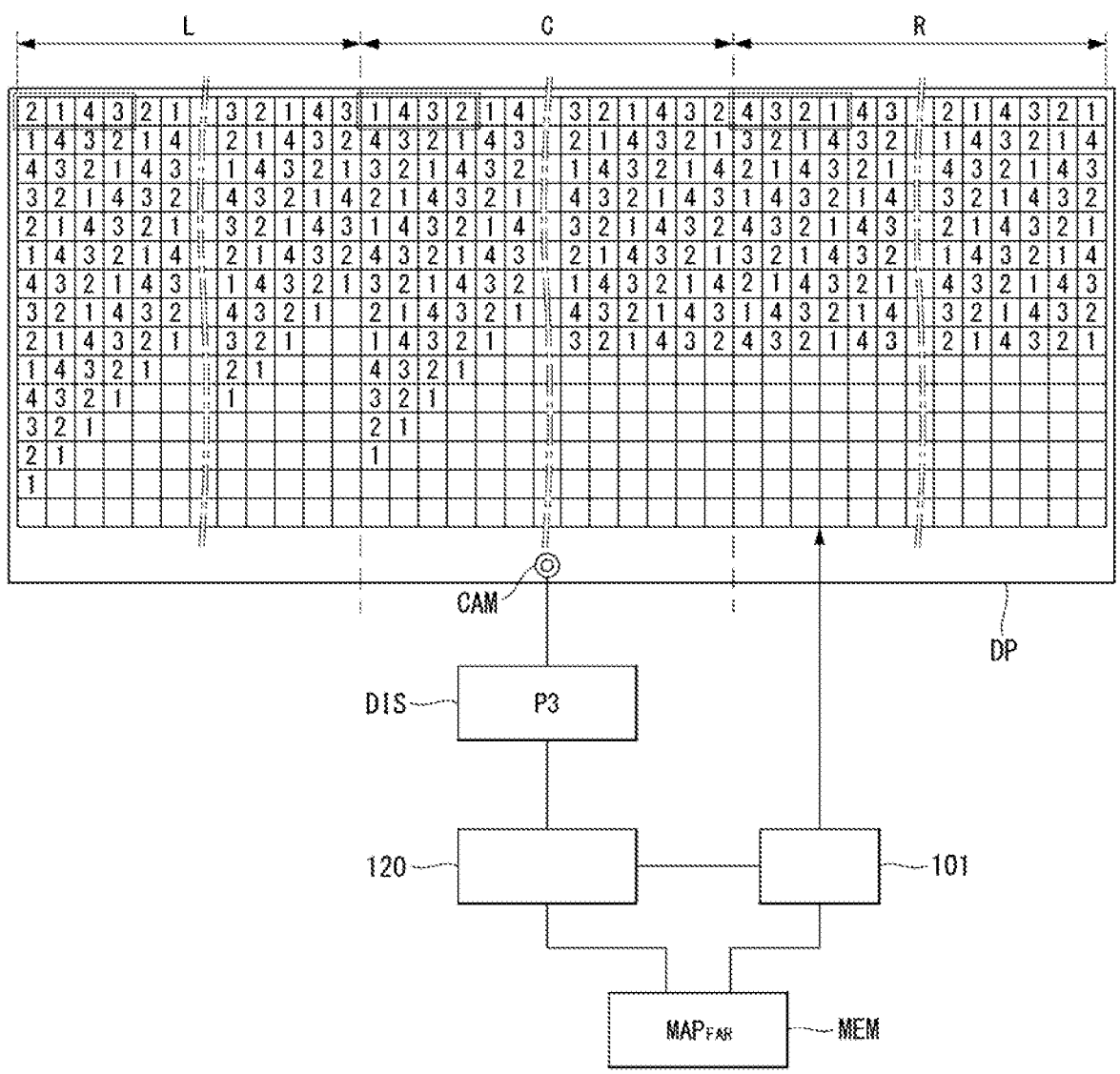
FIG. 8 is a schematic diagram illustrating a view map of the lenticular lens type autostereoscopic 3D display when the observer is located at a far distance from the display panel according to an embodiment of the present disclosure.

Hereinafter, referring to FIGS. 6 to 8, the view-maps corresponding to the observer's distance according to the present disclosure will be explained. FIG. 6 is a schematic diagram illustrating a view map of the lenticular lens type autostereoscopic 3D display when the observer is located at the optimum viewing distance. FIG. 7 is a schematic diagram illustrating a view map of the lenticular lens type autostereoscopic 3D display when the observer is located at a near distance from the display panel. FIG. 8 is a schematic diagram illustrating a view map of the lenticular lens type autostereoscopic 3D display when the observer is located at a far distance from the display panel.

Referring to FIG. 6, the case in which the observer is located at the optimum viewing distance will be explained. The position detector DIS attached on the display panel DP measures the distance between the observer and the display panel DP. Sending the flag corresponding to the distance of the observer to the view-map selector 120, the view-map selector 120 selects a standard view-map $MAP_{OVD}$ corresponding to the first view point P1 among the view-maps stored in the memory MEM. Then, the timing controller 101 sends the video images to the display panel DP in accordance with the standard view-map $MAP_{OVD}$.

Here, the standard view-map $MAP_{OVD}$ includes same pattern of order over the whole display panel DP, as shown in FIG. 6. For example, at the first row pixel areas PXL, the 4 images are arrayed as the order of 1-4-3-2 pattern from left to right. Further, at the first column pixel areas PXL, the 4 images are also arrayed as the order of 1-4-3-2 pattern from up to down. Even though the display panel DP is divided into the central area C, the left side area L and the right side area R, the same pattern of order is repeated over the whole display panel DP.

Next, referring to FIG. 7, the case in which the observer is located at the near viewing point closer to the display panel DP than the optimum viewing distance will be explained. The position detector DIS measures the distance between the observer and the display panel DP. Sending the flag corresponding to the distance of the observer to the view-map selector 120, the view-map selector 120 selects a near view-map $MAP_{NEAR}$ corresponding to the second view point P2 among the view-maps stored in the memory MEM. Then, the timing controller 101 sends the video images to the display panel DP in accordance with the near view-map $MAP_{NEAR}$.

Here, the near view-map $MAP_{NEAR}$ includes different patterns of orders over the whole display panel DP according to the divided areas, as shown in FIG. 7. For example, the display panel DP is divided into three areas including a central area C, a left side area L and a right side area R. At the central area C, the images according to the view-map having the same pattern as the view-map of the first viewing point P1 are applied to the left eye and the right eye of the observer. The central area C has the pixel areas PXL representing the images arrayed as the same view-map of the optimum viewing distance. For example, the order pattern of 1-4-3-2 is repeatedly arrayed at the central area C of the display panel DP.

In the interim, the left side area L and the right side area R include the pixel areas PXL for representing the images in accordance with the difference order pattern from the order pattern of the central area C. The left side area L and the right side area R represent the video images in accordance with the compensated view-maps from the standard view-map. For example, at the first pixel row in the left side area L, view-map order of 4-3-2-1 is repeatedly arrayed from left to right. Further, at the first pixel column in the left side area L, the view-map order of 4-3-2-1 is repeatedly arrayed from up to down. As the result, at the border of the central area C and the left side area L, at the first row, the order pattern would be irregular like 4-3-2-1-1-4-3-2.

In the interim, at the first pixel row of the right side area R, the order pattern of 2-1-4-3 is repeatedly arrayed from left to right. Further, at the first pixel column of the right side area R, the order pattern of 2-1-4-3 is repeatedly arrayed from up to down. As the result, at the border between the central area C and the right side area R, at the first row, the order pattern would be irregular like 1-4-3-2-2-1-4-3.

Next, referring to FIG. 8, the case in which the observer is located at the far viewing point far away from the display panel DP than the optimum viewing distance will be explained. The position detector DIS measures the distance between the observer and the display panel DP. Sending the flag corresponding to the distance of the observer to the view-map selector 120, the view-map selector 120 selects a far view-map $MAP_{FAR}$ corresponding to the third view point P3 among the view-maps stored in the memory MEM. Then, the timing controller 101 sends the video images to the display panel DP in accordance with the far view-map $MAP_{FAR}$.

Here, the far view-map $MAP_{FAR}$ includes different patterns of orders over the whole display panel DP according to the divided areas, as shown in FIG. 8. For example, the display panel DP is divided into three areas including a central area C, a left side area L and a right side area R. At the central area C, the images according to the view-map having the same pattern as the view-map of the first viewing point P1 are applied to the left eye and the right eye of the observer. The central area C has the pixel areas PXL representing the images arrayed as the same view-map of the optimum viewing distance. For example, the order pattern of 1-4-3-2 is repeatedly arrayed at the central area C of the display panel DP.

In the interim, the left side area L and the right side area R include the pixel areas PXL for representing the images in accordance with the difference order pattern from the order pattern of the central area C. The left side area L and the right side area R represent the video images in accordance with the compensated view-maps from the standard view-map. For example, at the first pixel row in the left side area L, the view-map order of 2-1-4-3 is repeatedly arrayed from left to right. Further, at the first pixel column in the left side area L, the view-map order of 2-1-4-3 is repeatedly arrayed from up to down. As the result, at the border of the central area C and the left side area L, at the first row, the order pattern would be irregular like 2-1-4-3-1-4-3-2.

In the interim, at the first pixel row of the right side area R, the order pattern of 4-3-2-1 is repeatedly arrayed from left to right. Further, at the first pixel column of the right side area R, the order pattern of 4-3-2-1 is repeatedly arrayed from up to down. As the result, at the border between the central area C and the right side area R, at the first row, the order pattern would be irregular like 1-4-3-2-4-3-2-1.

The range of the central area C, the left side area L and the right side area R and the view-map patterns of these areas are decided by the real observation method or by the calculation method. For more prefer view-maps, it is preferable that the real observation method is applied. For acquiring best view-maps, a lot of factors would be considered including size and the pitch of the pixel areas, the diagonal length of the display panel DP, the focus of the lenticular lens SLN, the gap between the lenticular lens SLN and the display panel DP and so on. Therefore, it is preferable that the view-maps, the number of the divided areas and the ranges may be predetermined and stored in the memory MEM, in accordance with the observer's location for the various specifications of the display panel used for the lenticular lens type autostereoscopic 3D display.

In the embodiments for the present disclosure, the view-maps for ensuring the correct stereoscopic images will be explained, as considering the three positions including the optimum viewing distance, the near viewing distance and the far viewing distance. The location of the observer is not divided into three cases. In some cases, the location of the observer may be divided into more number. The lenticular lens type autostereoscopic 3D display according to the present disclosure can always provide the correct stereoscopic images to the observer moving to any location. For example, a unit distance difference may be predetermined, and the view-maps in accordance with the observer's locations varying with the unit distance difference may be stored into the memory MEM. Then, as measuring the observer's distance by the position detector, the correct stereoscopic image can be always provided to the observer regardless of the position of the observer.

For example, the distance difference may be set 50 cm. Then the near viewing position may include a first near viewing position set on the −50 cm from the optimum viewing distance, a second near viewing position set on the −100 cm from the optimum viewing distance, and a third near viewing position set on the −150 cm from the optimum viewing distance. Here, for example, the minus sign (−) preferably means the forwarding direction close to the display panel DP. In the interim, the far viewing position may include a first far viewing position set on the +50 cm from the optimum viewing distance, a second far viewing position set on the +100 cm from the optimum viewing distance, and a third far viewing position set on the +150 cm from the optimum viewing distance. Here, for example, the plus sign (+) preferably means the forwarding direction away from the display panel DP.

The standard view-map is set for the optimum viewing distance. The first near view-map is set for the first near viewing position, the second near view-map is set for the second near viewing position, and the third near view-map is set for the third near viewing position. Further, the first far view-map is set for the first far viewing position, the second far view-map is set for the second far viewing position, and the third far view-map is set for the third far viewing position. After measuring the observer's position by the position detector DIS, and then deciding the closest position of the observer based on the measured position, the display panel DP. As a result, by providing the stereoscopic images based on the compensated view-map when the observer changes his location, the observer can enjoy the correct stereoscopic images always using the lenticular lens type autostereoscopic 3D display according to the present disclosure.

While the embodiments of the present disclosure have been described in detail with reference to the drawings, it will be understood by those skilled in the art that the disclosure can be implemented in other specific forms without changing the technical spirit or essential features of the disclosure. Therefore, it should be noted that the forgoing embodiments are merely illustrative in all aspects and are not to be construed as limiting the disclosure. The scope of the disclosure is defined by the appended claims rather than the detailed description of the disclosure. All changes or modifications or their equivalents made within the meanings and scope of the claims should be construed as falling within the scope of the disclosure.

What is claimed is:

1. An autostereoscopic 3D display comprising:
   a display panel including a plurality of pixels, and an aperture area disposed at each pixel;
   a lens film disposed on a front surface of the display panel and including a plurality of lenticular lenses, the lenticular lenses having a slanted axis and continuously arrayed along a lateral direction;
   a position detector measuring a distance of an observer from the display panel;
   a memory storing a plurality of view-maps; and
   a view-map selector selecting one of the view-maps stored in the memory in accordance with the distance of the observer from the display panel measured by the position detector,
   wherein the view-maps include:
      a standard view-map corresponding to an optimum viewing distance defined by a focal length of the lenticular lens;
      a first view-map corresponding to a first viewing point closer to the display panel than the optimum viewing distance; and
      a second view-map corresponding to a second view point farther away from the display panel than the optimum viewing distance, and
   wherein the first and the second view-maps include a same pattern order as the standard view-map for pixels in a central area of the display panel.

2. The autostereoscopic 3D display according to the claim 1, wherein any one lenticular lens includes n view areas where n is natural number, each of the view areas having a strip shape parallel with the slanted axis and having a view width, and the view widths of the view areas having a same value; and
   wherein any one aperture area disposed as corresponding to any one of the view areas.

3. The autostereoscopic 3D display according to the claim 2, wherein a $k^{th}$ view area corresponds to aperture areas disposed at pixels representing a $k^{th}$ video image, where k is one of 1 to n.

4. The autostereoscopic 3D display according to the claim 2, wherein a width of the aperture area is corresponding to the view width.

5. The autostereoscopic 3D display according to the claim 1, wherein the view-map selector selects the standard view-map when the position of the observer measured by the position detector is corresponding to the optimum viewing distance;
   wherein the view-map selector selects the first view-map when the position of the observer is corresponding to the first viewing point; and
   wherein the view-map selector selects the second view-map when the position of the observer is corresponding to the second viewing point.

6. The autostereoscopic 3D display according to the claim 1; wherein the first viewing position includes a plurality of near viewing positions set at every unit distance from the optimum view distance as going closer;
   wherein the first view-map includes a plurality of near view-maps corresponding to the plurality of the near viewing positions, respectively;
   wherein the second position includes a plurality of far viewing positions set at every unit distance from the optimum vide distance as going away; and
   wherein the second view-map includes a plurality of far view-maps corresponding to the plurality of the far viewing positions, respectively.

7. The autostereoscopic 3D display according to the claim 1, wherein the standard view-map has a standard view-map pattern by which all pixel areas of the display panel provide a same image to the observer located at the optimum viewing distance.

8. The autostereoscopic 3D display according to the claim 7, wherein the first view-map includes:
   the standard view-map pattern allocated at a first area of the display panel, the first area providing same image as the image of the optimum viewing distance to the observer located at the first viewing point; and
   a compensated view-map pattern allocated at a second area of the display panel, the second area providing different image from the image of the optimum viewing distance to the observer located at the first viewing point.

9. The autostereoscopic 3D display according to the claim 7, wherein the second view-map includes:
   the standard view-map pattern allocated at a first area of the display panel, the first area providing same image as the image of the optimum viewing distance to the observer located at the second viewing point; and
   a compensated view-map pattern allocated at a second area of the display panel, the second area providing different image from the image of the optimum viewing distance to the observer located at the second viewing point.

10. The autostereoscopic 3D display according to the claim 1, wherein the first and the second view-maps have different pattern orders than the standard view-map for pixels in a left side area of the display panel or a right side area of the display panel.

11. The autostereoscopic 3D display according to the claim 1, wherein the standard view-map includes a same pattern order for pixels in a central area of the display panel, a left side area of the display panel and a right side area of the display panel.

12. The autostereoscopic 3D display according to the claim 1, wherein the first view-map includes a pattern order identical to a pattern of the standard view-map for pixels in a central area of the display panel, and a first compensation pattern order for pixels in the left side area of the display panel or the right side area of the display panel, and wherein the first compensation pattern order is different than the pattern order for the pixels in the central area of the display panel.

13. The autostereoscopic 3D display according to the claim 1, wherein the second view-map includes a pattern order identical to a pattern of the standard view-map for pixels in the central area of the display panel, and a second compensation pattern order for pixels in a left side area of the display panel or a right side area of the display panel, and wherein the second compensation pattern order is different than the pattern order for the pixels in the central area of the display panel.

* * * * *